United States Patent
Shattuck et al.

(10) Patent No.: US 9,228,654 B2
(45) Date of Patent: Jan. 5, 2016

(54) SYSTEM AND METHOD FOR AUTOMATIC NEUTRAL AND AUTOMATIC RETURN-TO-RANGE FOR USE WITH AN AUTOMATIC TRANSMISSION

(71) Applicant: Allison Transmission, Inc., Indianapolis, IN (US)

(72) Inventors: Jared S. Shattuck, Indianapolis, IN (US); Burton Vance Krehbiel, Fishers, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 75 days.

(21) Appl. No.: 14/251,283

(22) Filed: Apr. 11, 2014

(65) Prior Publication Data
US 2015/0292615 A1 Oct. 15, 2015

(51) Int. Cl.
*B60W 10/10* (2012.01)
*B60W 10/18* (2012.01)
*F16H 59/54* (2006.01)

(52) U.S. Cl.
CPC .................................. *F16H 59/54* (2013.01)

(58) Field of Classification Search
None
See application file for complete search history.

(56) References Cited

U.S. PATENT DOCUMENTS

| 5,797,821 A * | 8/1998 | Fujimoto | F16H 61/0437 475/120 |
|---|---|---|---|
| 7,349,772 B2 | 3/2008 | Delany et al. | |
| 8,485,301 B2 | 7/2013 | Grubaugh et al. | |
| 2007/0192002 A1* | 8/2007 | Iyoda | B60G 17/0164 701/37 |
| 2009/0299585 A1 | 12/2009 | Trush et al. | |
| 2010/0217488 A1 | 8/2010 | Nijakowski et al. | |
| 2011/0087386 A1* | 4/2011 | Steinhauser | F16H 63/483 701/2 |

OTHER PUBLICATIONS

Allison 4th Generation Controls, Input Function AG, Automatic Neutral—Dual Input, Allison Transmission, Inc., Indianapolis, Indiana, Mar. 10, 2010.
International Searching Authority, International Search Report, dated Jul. 16, 2015 for PCT/US2015/025365.
International Searching Authority, Written Opinion of the International Search Authority, dated Jul. 16, 2015 for PCT/US2015/025365.

* cited by examiner

*Primary Examiner* — Edwin A Young
(74) *Attorney, Agent, or Firm* — Ice Miller LLP

(57) ABSTRACT

A powertrain incorporating an automatic transmission and an electrical control unit for control thereof, the electrical control unit implementing a return-to-range feature that will return to the automatic transmission to a previously selected forward (and, in some embodiments, reverse) gear when the service brake is applied first and then the parking brake is released while the service brake remains applied. Other embodiments are also disclosed.

40 Claims, 2 Drawing Sheets

SYSTEM AND METHOD FOR AUTOMATIC NEUTRAL AND AUTOMATIC RETURN-TO-RANGE FOR USE WITH AN AUTOMATIC TRANSMISSION

TECHNICAL FIELD OF THE DISCLOSED EMBODIMENTS

The embodiments disclosed herein related to automatic transmissions and methods for operating same and, more particularly, to a system and method for automatic neutral and automatic return-to-range for use with an automatic transmission.

BACKGROUND OF THE DISCLOSED EMBODIMENTS

Some vehicle powertrain systems incorporating automatic transmissions include the option to automatically shift the transmission to a neutral gear when the parking brake is applied. This is useful, for example, in a refuse packer vehicle that may make frequent stops where the driver exits the vehicle for a short time while leaving the engine running. Coming to a stop and engaging the parking brake will cause the transmission to be automatically shifted to a neutral gear, thus saving the driver the time that would be required to shift to a neutral gear using the transmission control selector. When the driver returns to the vehicle, releasing the parking brake will cause the transmission to be automatically shifted to the previous drive gear, thus saving the driver from using the transmission range selector to shift the transmission back into a drive gear. This system requires dual redundant wires indicating the status of the parking brake be applied to the transmission control unit. As long as the service brake is not indicated to be in error, if both of the redundant wires indicate that the parking brake has been released, the transmission will automatically be shifted to the previous drive gear.

Therefore, there remains room for improvements in the provision of the automatic functions in an automatic transmission.

SUMMARY OF THE DISCLOSED EMBODIMENTS

In one embodiment, a powertrain incorporating an automatic transmission and an electrical control unit for control thereof is disclosed, the electrical control unit implementing a return-to-range feature that will return to the automatic transmission to a previously selected forward (and, in some embodiments, reverse) gear when the service brake is applied first and then the parking brake is released while the service brake remains applied.

In one embodiment, a method executable by an electronic control system mounted to a transmission of a powered vehicle while the vehicle is in operation is disclosed, wherein the transmission has a number of forward ranges and a neutral gear selectable by a transmission gear selector, the method comprising: a) receiving a service brake signal from a service brake sensor coupled to a service brake of the vehicle; b) receiving a parking brake signal from a parking brake sensor coupled to a parking brake of the vehicle; c) receiving a transmission gear selector signal from a selector sensor coupled to the transmission gear selector; d) determining a currently selected one of the forward ranges using the transmission gear selector signal; e) determining that the transmission is in the neutral gear; and f) issuing a transmission return-to-range command to the transmission to cause the transmission to transition from the neutral gear to the currently selected one of the forward ranges when it is determined that: f.1) the service brake signal indicates that the service brake has been transitioned between applied and not applied a predetermined number of times after the electronic control system has been initialized; f.2) the service brake signal indicates that the service brake is applied; and f.3) while the service brake signal indicates that the service brake remains applied, the parking brake signal indicates that the parking brake is released.

In one embodiment, a method executable by an electronic control system mounted to a transmission of a powered vehicle while the vehicle is in operation is disclosed, wherein the transmission has a number of forward ranges, at least one reverse range and a neutral gear selectable by a transmission gear selector, the method comprising: a) receiving a service brake signal from a service brake sensor coupled to a service brake of the vehicle; b) receiving a parking brake signal from a parking brake sensor coupled to a parking brake of the vehicle; c) receiving a transmission gear selector signal from a selector sensor coupled to the transmission gear selector; d) determining that one of the at least one reverse range is selected using the transmission gear selector signal; e) determining that the transmission is in the neutral gear; and f) issuing a transmission return-to-range command to the transmission to cause the transmission to transition from the neutral gear to said one of the at least one reverse range when it is determined that: f.1) the service brake signal indicates that the service brake has been transitioned between applied and not applied a predetermined number of times after the electronic control system has been initialized; f.2) the service brake signal indicates that the service brake is applied; and f.3) while the service brake signal indicates that the service brake remains applied, the parking brake signal indicates that the parking brake is released.

In one embodiment, a transmission assembly for a powered vehicle is disclosed, comprising: a transmission gear selector; a selector sensor coupled to the transmission gear selector and operative to produce a transmission gear selector signal indicative of a gear selected by the transmission gear selector; a transmission including a number of forward ranges and a neutral gear selectable by the transmission gear selector; a service brake sensor coupled to a service brake of the vehicle and operative to produce a service brake signal indicative of a state of application of the service brake; a parking brake sensor coupled to a parking brake of the vehicle and operative to produce a parking brake signal indicative of a state of application of the parking brake; a control unit coupled to the transmission, the control unit having memory, processor circuitry, and executable routines stored in memory to receive electronic signals from the selector sensor, service brake sensor, and parking brake sensor, determine a currently selected one of the forward ranges using the transmission gear selector signal, and issue a transmission return-to-range command to the transmission to cause the transmission to transition from the neutral gear to the currently selected one of the forward ranges when it is determined that the service brake signal indicates that the service brake has been transitioned between applied and not applied a predetermined number of times after the control unit has been initialized; the service brake signal indicates that the service brake is applied; and while the service brake signal indicates that the service brake remains applied, the parking brake signal indicates that the parking brake is released.

In another embodiment, a transmission assembly for a powered vehicle is disclosed, comprising: a transmission gear selector; a selector sensor coupled to the transmission gear selector and operative to produce a transmission gear selector signal indicative of a gear selected by the transmission gear selector; a transmission including a number of forward ranges, at least one reverse range and a neutral gear selectable by the transmission gear selector; a service brake sensor coupled to a service brake of the vehicle and operative to produce a service brake signal indicative of a state of application of the service brake; a parking brake sensor coupled to a parking brake of the vehicle and operative to produce a parking brake signal indicative of a state of application of the parking brake; a control unit coupled to the transmission, the control unit having memory, processor circuitry, and executable routines stored in memory to receive electronic signals from the selector sensor, service brake sensor, and parking brake sensor, determine that one of the at least one reverse range is selected using the transmission gear selector signal, and issue a transmission return-to-range command to the transmission to cause the transmission to transition from the neutral gear to said one of the at least one reverse range when it is determined that the service brake signal indicates that the service brake has been transitioned between applied and not applied a predetermined number of times after the control unit has been initialized; the service brake signal indicates that the service brake is applied; and while the service brake signal indicates that the service brake remains applied, the parking brake signal indicates that the parking brake is released.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
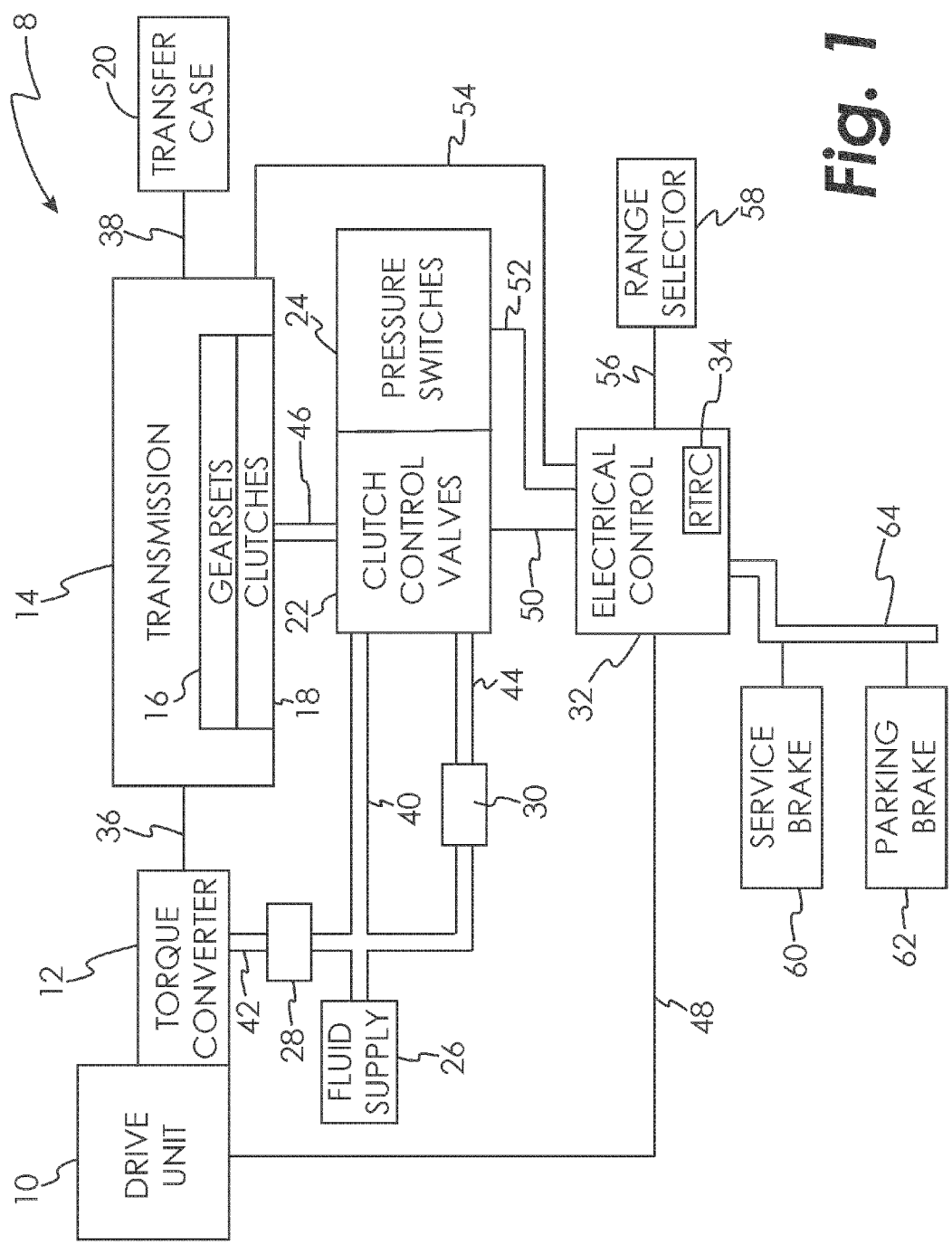
FIG. 1 is a schematic block diagram of a driveline of a vehicle equipped with an automatic transmission and a return-to-range control in accordance with an embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Alterations and modifications in the illustrated device, and further applications of the principles of the invention as illustrated therein, as would normally occur to one skilled in the art to which the invention relates are contemplated, are desired to be protected. Such alternative embodiments require certain adaptations to the embodiments discussed herein that would be obvious to those skilled in the art.

Disclosed herein are systems and methods that allow an operator of a vehicle incorporating an automatic transmission the ability to release the parking brake to return to range from neutral without having to select drive on the transmission range selector if drive had previously been selected prior to applying the parking brake. In one embodiment, in a vehicle 8 having a powertrain driveline as shown schematically in FIG. 1, return-to-range control (RTRC) 34 is provided in an electrical control unit 32 for an automatic transmission 14. RTRC 34 comprises computer programming instructions or logic executable to perform one or more of the methods described herein. A microprocessor or similar device of electrical control unit 32 is configured to access and execute RTRC 34.

In general, electrical control unit 32 controls operation of transmission 14 based on inputs from drive unit 10, torque converter 12, transmission 14, range selector 58, service brake 60, parking brake 62 and/or other inputs. Such inputs may include electrical and/or analog signals received from sensors, controls or other like devices associated with the vehicle components. For instance, inputs may include signals indicative of transmission input speed, driver requested torque, engine output torque, engine speed, temperature of the hydraulic fluid, transmission output speed, turbine speed, brake position, gear ratio, torque converter slip, and/or other measurable parameters.

Electrical control unit 32 may include electrical circuitry configured to process, analyze or evaluate one or more inputs and issue electrical control signals as needed through one or more electrical lines or conductors. Such connections may include hard-wired and/or networked components in any suitable configuration including, for example, insulated wiring and/or wireless transmission as may be appropriate or desired.

Electrical circuitry of electrical control unit 32 may include computer circuitry such as one or more microprocessors and related elements configured to process executable instructions expressed in computer programming code or logic, which is stored in one or more tangible media, i.e., any suitable form of memory or storage media that is accessible or readable by the processor or processors. Electrical control unit 32 may also include analog-to-digital converters and/or other signal processing circuitry or devices as needed to process one or more of the inputs received from the vehicle components.

While shown schematically as a single block 32, it will be understood by those skilled in the art that portions of electrical control unit 32 may be implemented as separate logical or physical structures. For example, RTRC 34 may be physically and/or logically separated from other electronic controls for transmission 14 or electronic controls for drive unit 10. All or portions of RTRC 34 may alternatively or in addition be executed by a controller that is not on-board the transmission, such as an external controller located at the transmission manufacturer or assembly location but is connectable to the transmission.

Electrical control unit 32 may be in communication with drive unit 10 via one or more links 48, with clutch control valves 22 via one or more links 50, with pressure switches 24 via one or more links 52, with transmission 14 via one or more links 54, and with a range selector 58 via one or more links 56.

Drive unit 10 may include an internal combustion engine, such as a spark-ignited engine or diesel engine, an engineelectric motor combination, or the like. Drive unit 10 is coupled to transmission 14 by a transmission input shaft 36. A fluidic torque converter 12 is generally interposed between drive unit 10 and transmission 14 to selectively establish a mechanical coupling. Transmission 14 is coupled to the vehicle drive wheels via an output shaft 38 in one of several conventional ways. A transfer case 20 may be shiftable to select one of several drive conditions, including various combinations of two-wheel drive and four-wheel drive, high or low speed ranges, and the like.

Transmission 14 is an automatic transmission. Transmission 14 may include a gear assembly of the type described in U.S. Pat. No. 4,070,927 to Polak or another type, and may have an electro-hydraulic control of the type described in U.S. Patent Application Publication No. 2003/0114261 to Moorman, et al. or in U.S. Pat. No. 5,601,506 to Long, et al. or another type. Transmission 14 is shiftable to selectively establish one of several ranges including, for example, a neutral range, a reverse range, a drive range, and/or a plurality of manually selectable forward ranges.

The number of available forward ranges is determined by the configuration of the transmission gearsets 16 and clutches 18. For example, transmission 14 may have three interconnected planetary gearsets and five clutches which are controllable to provide six forward gears. Other configurations, such as an eight-speed configuration, may also be used.

Operation of clutches 18 is controlled by an electro-hydraulic control system including a plurality of control valves 22 and a supply of hydraulic fluid 26. In general, each valve 22 includes a solenoid, such as a variable bleed solenoid, on/off solenoid, or similar device. Fluid supply 26 is operable to supply hydraulic fluid to torque converter 12 via one or more passages or conduits 42 and to valves 22 via a plurality of passages or conduits 40, 44. Pressure regulator valves 28, 30 operate to regulate fluid pressure in lines 42, 44, respectively.

Electrical control unit 32 sends electrical signals to control valves 22 via the one or more links 50, for example, in response to a shift request received from range selector 58. The electrical signals cause one or more of the control valves 22 to adjust fluid pressure or fluid flow direction in one or more of the fluid passages connecting valves 22 and clutches 18.

Figure 2:
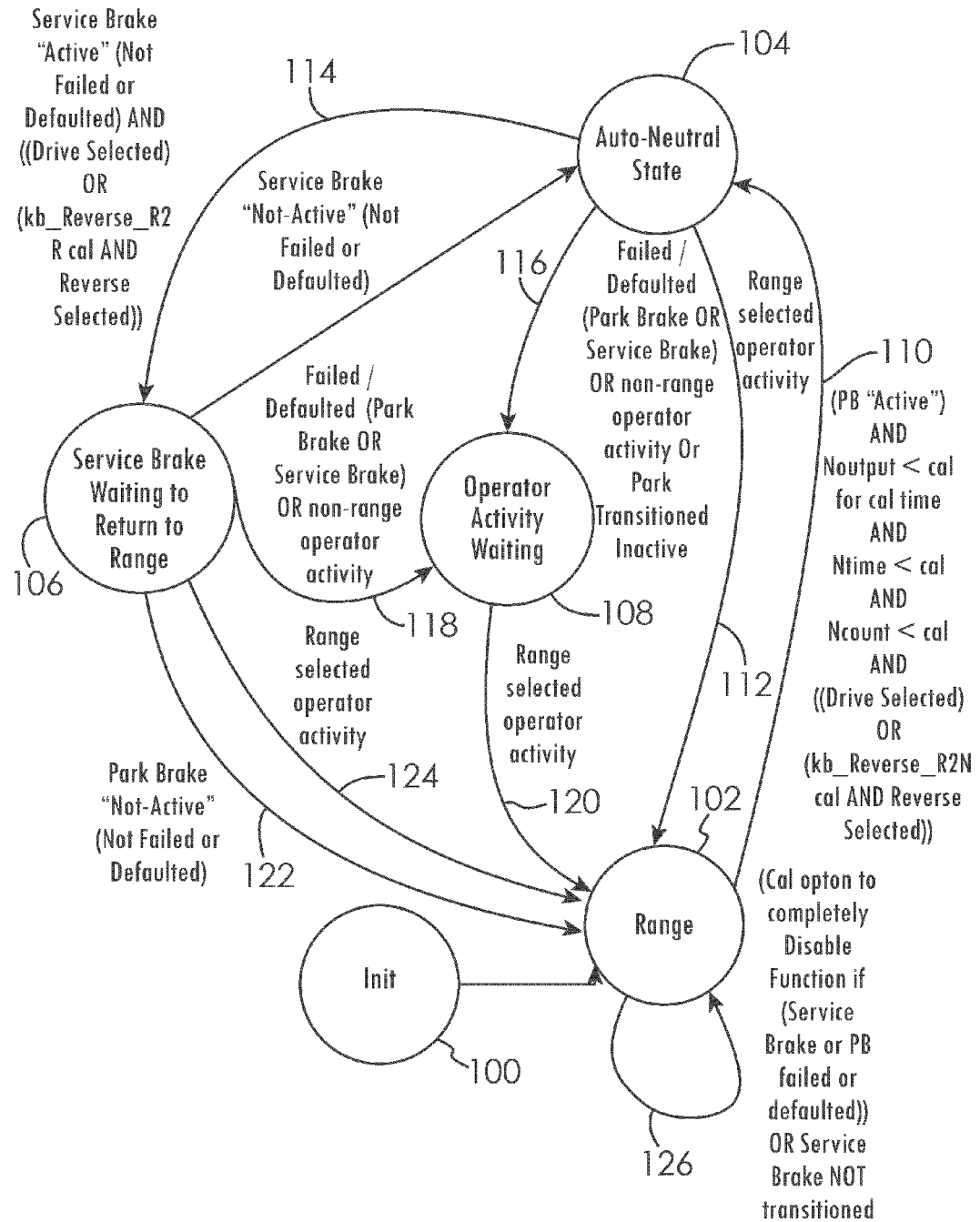
FIG. 2 is a state diagram schematically illustrating an automatic return-to-range control in accordance with an embodiment.

Referring now to FIG. 2, a state diagram for one embodiment implementation of the RTRC 34 is schematically illustrated. As discussed above, the RTRC 34 allows an operator of a vehicle 8 incorporating an automatic transmission 14 the ability to release the parking brake 62 to return to range without having to select drive on the transmission range selector 58 if drive had previously been selected prior to applying the parking brake 62.

As is known in the art, when the vehicle 8 is stopped when the transmission 14 is in range and the parking brake 62 is applied, the electrical control unit 32 may activate an automatic neutral function, placing the transmission 14 into a neutral gear. In one embodiment of the return-to-range control (RTRC) 34 disclosed herein, the return-to-range feature will return the transmission 14 to the previously selected forward (and, in some embodiments, reverse) gear when the service brake 60 is applied first and then the parking brake 62 is released while the service brake 60 remains applied. The detection of application of the service brake 60 status and parking brake 62 status may be determined by data received on an appropriate communication bus 64 coupled to the electrical control unit 32 such as, for example, Society of Automotive Engineers (SAE) Standard J1939 (Cruise Control/Vehicle Speed (CCVS)) or Electronic Brake Controller 1 (EBC1)), or an OEM proprietary message, to name just three non-limiting examples. By obtaining the service brake 60 status and parking brake 62 status over the communication bus, the use of two discrete inputs on the electrical control unit 32 may be avoided, leaving them available for other uses.

As shown in the embodiment illustrated in FIG. 2, the RTRC 34 is initialized at 100 upon system power-up or reset, and proceeds to state 102 where the transmission 14 is in range. Other states may include an auto-neutral state 104, a waiting to return to range state 106, and an operator activity waiting state 108. The RTRC 34 may transition from state 102 to activate the auto-neutral state 104 on path 110 if it is sensed on the communication bus 64 that the parking brake 62 is engaged and a forward gear (or, in some embodiments, a reverse gear) is selected on the range selector 58. For safety considerations, some embodiments may not allow automatic return-to-range when a reverse gear is selected on the range selector 58; however, it will be appreciated that this feature can be enabled or disabled by appropriate programming in the RTRC 34.

Other conditions may be imposed in order to transition on the path 110 between the range state 102 and the auto-neutral state 104. For example, RTRC 34 may require that the output speed of the transmission 14 (determined, for example, by an appropriate sensor at the yoke on the rear of the transmission 14) be less than a predetermined speed limit for a predetermined period of time. Such predetermined variables may be provided to the executable software of the RTRC 34. Additionally, the RTRC 34 may require that the system has not transitioned between the range state 102 and the auto-neutral state 104 and back (on path 112) more than a predetermined number of times. This can occur, for example, if the RTRC 34 is receiving faulty messages indicating that the parking brake 62 has been applied when it has not. In this situation, the transmission 14 will be placed into neutral and the operator will use the range selector 58 to select a forward gear because the operator did not desire the transmission 14 to be placed into neutral. Receipt of any operator input through the range selector 58 indicates that the operator does not desire the transition to auto-neutral state 104, and the RTRC 34 will transition back to the range state 102 along path 112. If this transition happens more than a predetermined number of times, RTRC 34 may conclude that it is receiving faulty information about the status of the parking brake 62. Under these conditions the RTRC 34 will prevent the transition to the auto-neutral state 104 along path 110. RTRC 34 will remain in state 102 until the vehicle has moved from a stationary condition. The RTRC 34 will conclude that the vehicle is not stationary by monitoring that transmission 14 is in a drive gear and may require that the turbine speed of the transmission 14 (determined, for example, by an appropriate sensor at the turbine side of the torque converter of the transmission 14) be greater than a predetermined speed limit. A non-stationary judgment will reset the predetermined number of times that the RTRC 34 can transition from range state 102 to auto-neutral state 104 along path 110.

If the RTRC 34 is in state 104, the normal progression is to transition to the waiting to return to range state 106 on path 114. The auto-neutral state 104 transitions on path 114 to the waiting to return to range state 106 when the service brake 60 status is indicated to be active on the communication bus 64 and a forward gear (or, in some embodiments, a reverse gear) is selected. RTRC 34 will remain at the waiting to return to range state 106 awaiting an indication that the parking brake 62 is no longer active, and so long as the service brake 60 and/or parking brake 62 have not failed or defaulted. For example, if the service brake 60 status and/or parking brake 62 status on the communication bus 64 have timed out or are indicated to be in error, RTRC 34 knows that the service brake 60 status and/or parking brake 62 status cannot be relied upon for decision making because they may not represent the true status of the service brake 60 and/or parking brake 62. Therefore, if the service brake 60 status and/or parking brake 62 status are determined to be unreliable at the auto-neutral state 104, RTRC 34 transitions to operator activity waiting state 108 on path 116. If the service brake 60 status and/or parking brake 62 status are determined to be unreliable at the waiting to return to range state 106, the RTRC 34 transitions to operator activity waiting state 108 on path 118. The paths 116 and 118 will also be followed by RTRC 34 if any non-range activity on the range selector 58 is detected while RTRC 34 is in either state 104 or 106. At operator activity waiting state 108, RTRC 34 waits for the operator to select a gear using the range selector 58. Once this occurs, the RTRC 34 transitions to range state 102 along path 120.

While in the waiting to return to range state 106, RTRC 34 will return to the range state 102 on path 122 when the service brake 60 is applied ("active") first and then the parking brake 62 is released while service brake 60 remains active. Additionally, path 122 is followed only if the service brake 60 and parking brake 62 status are not failed or defaulted. RTRC 34 may also transition from waiting to return to range state 106 to range state 102 on path 124 if the operator has selected a forward gear (or, in some embodiments, a reverse gear) using the range selector 58.

RTRC 34 may perform system reliability checks while at range state 102 in order to determine if transitioning to the auto-neutral state 104 will be permitted. On path 126, RTRC 34 may disable the auto-neutral state 104 (and hence the waiting to return to range state 106) if it is determined that the service brake 60 status and/or parking brake 62 status on the communication bus 64 have timed out or are indicated to be in error. In this situation, RTRC 34 knows that the service brake 60 status and/or parking brake 62 status cannot be relied upon for decision making because they may not represent the true status of the service brake 60 and/or parking brake 62. Therefore, if the service brake 60 status and/or parking brake 62 status are determined to be unreliable at range state 102, the RTRC 34 remains at range state 102 and will not transition to the auto-neutral state 104 (and hence the waiting to return to range state 106).

Another check RTRC 34 may perform for system reliability while at range state 102 in order to determine if transitioning to the auto-neutral state 104 will be permitted is a check for transitioning of the service brake 60. For example, at start-up of the vehicle 8, RTRC 34 may look for a predetermined number of transitions of the service brake 60 in order to verify that the service brake 60 sensor is functioning properly and not stuck in the active or inactive state. The transition from range state 102 to auto-neutral state 104 on path 110 will not be allowed by RTRC 34 until the predetermined number of transitions are observed.

RTRC 34 may also use input received from other vehicle sensors and/or control systems in order to determine state transitions. For example, state transitions may be limited or prohibited upon sensing conditions that may make such state transitions potentially undesirable, such as receiving sensor data indicating that a throttle speed is over a predetermined limit, a stabilizing hydraulic outrigger is deployed (e.g., when the vehicle 8 is a utility truck), a door is open (e.g., when the vehicle 8 is a school bus), etc.

It will be appreciated from the foregoing that the electrical control unit 32 implementing an RTRC 34 may be implemented that will return to the automatic transmission to a previously selected forward (and, in some embodiments, reverse) gear when the service brake is applied first and then the parking brake is released while the service brake remains applied. The RTRC 34 may receive information regarding the status of the service brake 60 and parking brake 62 via a system communication bus 64.

While this disclosure has been described using disclosed embodiments, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A method executable by an electronic control system mounted to a transmission of a powered vehicle while the vehicle is in operation, wherein the transmission has a number of forward ranges and a neutral gear selectable by a transmission gear selector, the method comprising:
   a) receiving a service brake signal from a service brake sensor coupled to a service brake of the vehicle;
   b) receiving a parking brake signal from a parking brake sensor coupled to a parking brake of the vehicle;
   c) receiving a transmission gear selector signal from a selector sensor coupled to the transmission gear selector;
   d) determining a currently selected one of the forward ranges using the transmission gear selector signal;
   e) determining that the transmission is in the neutral gear; and
   f) issuing a transmission return-to-range command to the transmission to cause the transmission to transition from the neutral gear to the currently selected one of the forward ranges when it is determined that:
      f.1) the service brake signal indicates that the service brake has been transitioned between applied and not applied a predetermined number of times after the electronic control system has been initialized;
      f.2) the service brake signal indicates that the service brake is currently applied; and
      f.3) while the service brake signal indicates that the service brake remains applied, the parking brake signal indicates that the parking brake is released.

2. The method of claim 1, wherein the service brake signal and the parking brake signal are received as messages over a digital communication bus.

3. The method of claim 2, wherein the communication bus messages are selected from the group consisting of: Society of Automotive Engineers (SAE) Standard J1939 (Cruise Control/Vehicle Speed (CCVS)) or Electronic Brake Controller 1 (EBC1)), or an OEM proprietary message.

4. The method of claim 1, further comprising:
   g) issuing a transmission auto-neutral command to the transmission to cause the transmission to transition from the currently selected one of the forward ranges to the neutral gear when it is determined that:

g.1) the service brake signal indicates that the service brake has been transitioned between applied and not applied a predetermined number of times after the electronic control system has been initialized;
g.2) the parking brake signal indicates that the parking brake is applied; and
g.3) one of the forward ranges is selected.

5. The method of claim 4, further comprising:
h) determining that an operator of the vehicle has changed a selected gear using the transmission gear selector signal;
i) issuing the transmission return-to-range command to the transmission to cause the transmission to transition from the neutral gear to the currently selected one of the forward ranges when it is determined that the operator of the vehicle has changed the selected gear.

6. The method of claim 5, further comprising:
j) inhibiting execution of step (g) if a counter indicates that the system has previously executed step (g), then step (i), then step (g) more than a predetermined number of times while the vehicle is stationary.

7. The method of claim 6, further comprising:
k) determining that one of the forward ranges is selected using the transmission gear selector signal;
l) receiving a turbine speed signal from a transmission turbine speed sensor coupled to the transmission;
m) resetting the counter if the transmission gear selector signal indicates that one of the forward ranges is selected and the turbine speed signal indicates that the vehicle is not stationary.

8. The method of claim 4, further comprising:
h) inhibiting execution of step (g) if the system has previously executed step (f), then step (g), then step (f) more than a predetermined number of times while the vehicle is stationary.

9. The method of claim 4, further comprising:
h) inhibiting execution of step (g) if the one or more of the following conditions exists:
h.1) the service brake signal has not been received for a first predetermined time period;
h.2) the parking brake signal has not been received for a second predetermined time period;
h.3) the service brake signal is indicated to be in error; and
h.4) the parking brake signal is indicated to be in error.

10. The method of claim 1, further comprising:
g) receiving a transmission output speed signal from a transmission speed sensor coupled to the transmission;
h) determining an output speed of the transmission using the transmission output speed signal;
i) issuing a transmission auto-neutral command to the transmission to cause the transmission to transition from the currently selected one of the forward ranges to the neutral gear when it is determined that:
i.1) the service brake signal indicates that the service brake has been transitioned between applied and not applied a predetermined number of times after the electronic control system has been initialized;
i.2) the parking brake signal indicates that the parking brake is applied;
i.3) one of the forward ranges is selected; and
i.4) an output speed of the transmission is less than a predetermined speed limit.

11. A method executable by an electronic control system mounted to a transmission of a powered vehicle while the vehicle is in operation, wherein the transmission has a number of forward ranges, at least one reverse range and a neutral gear selectable by a transmission gear selector, the method comprising:
a) receiving a service brake signal from a service brake sensor coupled to a service brake of the vehicle;
b) receiving a parking brake signal from a parking brake sensor coupled to a parking brake of the vehicle;
c) receiving a transmission gear selector signal from a selector sensor coupled to the transmission gear selector;
d) determining that one of the at least one reverse range is selected using the transmission gear selector signal;
e) determining that the transmission is in the neutral gear; and
f) issuing a transmission return-to-range command to the transmission to cause the transmission to transition from the neutral gear to said one of the at least one reverse range when it is determined that:
f.1) the service brake signal indicates that the service brake has been transitioned between applied and not applied a predetermined number of times after the electronic control system has been initialized;
f.2) the service brake signal indicates that the service brake is currently applied; and
f.3) while the service brake signal indicates that the service brake remains applied, the parking brake signal indicates that the parking brake is released.

12. The method of claim 11, wherein the service brake signal and the parking brake signal are received as messages over a digital communication bus.

13. The method of claim 12, wherein the communication bus messages are selected from the group consisting of: Society of Automotive Engineers (SAE) Standard J1939 (Cruise Control/Vehicle Speed (CCVS)) or Electronic Brake Controller 1 (EBC1)), or an OEM proprietary message.

14. The method of claim 11, further comprising:
g) issuing a transmission auto-neutral command to the transmission to cause the transmission to transition from said one of the at least one reverse range to the neutral gear when it is determined that:
g.1) the service brake signal indicates that the service brake has been transitioned between applied and not applied a predetermined number of times after the electronic control system has been initialized;
g.2) the parking brake signal indicates that the parking brake is applied; and
g.3) said one of the at least one reverse range is selected.

15. The method of claim 14, further comprising:
h) determining that an operator of the vehicle has changed a selected gear using the transmission gear selector signal;
i) issuing the transmission return-to-range command to the transmission to cause the transmission to transition from the neutral gear to the currently selected one of the at least one reverse range when it is determined that the operator of the vehicle has changed the selected gear.

16. The method of claim 15, further comprising:
j) inhibiting execution of step (g) if a counter indicates that the system has previously executed step (g), then step (i), then step (g) more than a predetermined number of times while the vehicle is stationary.

17. The method of claim 16, further comprising:
k) determining that one of the at least one reverse range is selected using the transmission gear selector signal;
l) receiving a turbine speed signal from a transmission turbine speed sensor coupled to the transmission;

m) resetting the counter if the transmission gear selector signal indicates that one of the at least one reverse range is selected and the turbine speed signal indicates that the vehicle is not stationary.

18. The method of claim 14, further comprising:
h) inhibiting execution of step (g) if the system has previously executed step (f), then step (g), then step (f) more than a predetermined number of times while the vehicle is stationary.

19. The method of claim 14, further comprising:
h) inhibiting execution of step (g) if the one or more of the following conditions exists:
   h.1) the service brake signal has not been received for a first predetermined time period;
   h.2) the parking brake signal has not been received for a second predetermined time period;
   h.3) the service brake signal is indicated to be in error; and
   h.4) the parking brake signal is indicated to be in error.

20. The method of claim 11, further comprising:
g) receiving a transmission output speed signal from a transmission speed sensor coupled to the transmission;
h) determining an output speed of the transmission using the transmission output speed signal;
i) issuing a transmission auto-neutral command to the transmission to cause the transmission to transition from the reverse gear to the neutral gear when it is determined that:
   i.1) the service brake signal indicates that the service brake has been transitioned between applied and not applied a predetermined number of times after the electronic control system has been initialized;
   i.2) the parking brake signal indicates that the parking brake is applied;
   i.3) said one of the at least one reverse range is selected; and
   i.4) an output speed of the transmission is less than a predetermined speed limit.

21. A transmission assembly for a powered vehicle, comprising:
a transmission gear selector;
a selector sensor coupled to the transmission gear selector and operative to produce a transmission gear selector signal indicative of a gear selected by the transmission gear selector;
a transmission including a number of forward ranges and a neutral gear selectable by the transmission gear selector;
a service brake sensor coupled to a service brake of the vehicle and operative to produce a service brake signal indicative of a state of application of the service brake;
a parking brake sensor coupled to a parking brake of the vehicle and operative to produce a parking brake signal indicative of a state of application of the parking brake;
a control unit coupled to the transmission, the control unit having memory, processor circuitry, and executable routines stored in memory to receive electronic signals from the selector sensor, service brake sensor, and parking brake sensor, determine a currently selected one of the forward ranges using the transmission gear selector signal, and issue a transmission return-to-range command to the transmission to cause the transmission to transition from the neutral gear to the currently selected one of the forward ranges when it is determined that the service brake signal indicates that the service brake has been transitioned between applied and not applied a predetermined number of times after the control unit has been initialized; the service brake signal indicates that the service brake is currently applied; and while the service brake signal indicates that the service brake remains applied, the parking brake signal indicates that the parking brake is released.

22. The transmission assembly of claim 21, wherein the control unit receives the service brake signal and the parking brake signal as messages over a digital communication bus.

23. The transmission assembly of claim 22, wherein the communication bus messages are selected from the group consisting of: Society of Automotive Engineers (SAE) Standard J1939 (Cruise Control/Vehicle Speed (CCVS)) or Electronic Brake Controller 1 (EBC1)), or an OEM proprietary message.

24. The transmission assembly of claim 21, wherein the control unit is further operative to issue a transmission auto-neutral command to the transmission to cause the transmission to transition from the currently selected one of the forward ranges to the neutral gear when it is determined that the service brake signal indicates that the service brake has been transitioned between applied and not applied a predetermined number of times after the control unit has been initialized; the parking brake signal indicates that the parking brake is applied and one of the forward ranges is selected.

25. The transmission assembly of claim 24, wherein the control unit is further operative to determine that an operator of the vehicle has changed a selected gear using the transmission gear selector signal and issue the transmission return-to-range command to the transmission to cause the transmission to transition from the neutral gear to the currently selected one of the forward ranges when it is determined that the operator of the vehicle has changed the selected gear.

26. The transmission assembly of claim 25, wherein the control unit is further operative to inhibit issuing the transmission auto-neutral command if a counter indicates that the system has previously issued the transmission auto-neutral command, then issued the transmission return-to-range command when it is determined that the operator of the vehicle has changed the selected gear, then issued the transmission auto-neutral command more than a predetermined number of times while the vehicle is stationary.

27. The transmission assembly of claim 26, further comprising:
a turbine speed sensor coupled to the transmission and operative to produce a turbine speed signal indicative of a vehicle speed;
wherein the control unit is further operative to determine that one of the forward ranges is selected using the transmission gear selector signal, receive a turbine speed signal from the turbine speed sensor, and reset the counter if the transmission gear selector signal indicates that one of the forward ranges is selected and the turbine speed signal indicates that the vehicle is not stationary.

28. The transmission assembly of claim 24, wherein the control unit is further operative to inhibit issuing the transmission auto-neutral command if the system has previously issued the transmission return-to-range command, then issued the transmission auto-neutral command, then issued the transmission return-to-range command more than a predetermined number of times while the vehicle is stationary.

29. The transmission assembly of claim 24, wherein the control unit is further operative to inhibit issuing the transmission auto-neutral command if the one or more of the following conditions exists:
a) the service brake signal has not been received for a first predetermined time period;
b) the parking brake signal has not been received for a second predetermined time period;

c) the service brake signal is indicated to be in error; and d) the parking brake signal is indicated to be in error.

30. The transmission assembly of claim 21, further comprising:

a transmission speed sensor coupled to the transmission and operative to produce a transmission output speed signal indicative of an output speed of the transmission;

wherein the control unit is further operative to receive the transmission output speed signal, determine an output speed of the transmission using the transmission output speed signal, issue a transmission auto-neutral command to the transmission to cause the transmission to transition from the currently selected one of the forward ranges to the neutral gear when it is determined that the service brake signal indicates that the service brake has been transitioned between applied and not applied a predetermined number of times after the control unit has been initialized, the parking brake signal indicates that the parking brake is applied, one of the forward ranges is selected, and an output speed of the transmission is less than a predetermined speed limit.

31. A transmission assembly for a powered vehicle, comprising:

a transmission gear selector;

a selector sensor coupled to the transmission gear selector and operative to produce a transmission gear selector signal indicative of a gear selected by the transmission gear selector;

a transmission including a number of forward ranges, at least one reverse range and a neutral gear selectable by the transmission gear selector;

a service brake sensor coupled to a service brake of the vehicle and operative to produce a service brake signal indicative of a state of application of the service brake;

a parking brake sensor coupled to a parking brake of the vehicle and operative to produce a parking brake signal indicative of a state of application of the parking brake;

a control unit coupled to the transmission, the control unit having memory, processor circuitry, and executable routines stored in memory to receive electronic signals from the selector sensor, service brake sensor, and parking brake sensor, determine that one of the at least one reverse range is selected using the transmission gear selector signal, and issue a transmission return-to-range command to the transmission to cause the transmission to transition from the neutral gear to said one of the at least one reverse range when it is determined that the service brake signal indicates that the service brake has been transitioned between applied and not applied a predetermined number of times after the control unit has been initialized; the service brake signal indicates that the service brake is currently applied; and while the service brake signal indicates that the service brake remains applied, the parking brake signal indicates that the parking brake is released.

32. The transmission assembly of claim 31, wherein the control unit receives the service brake signal and the parking brake signal as messages over a digital communication bus.

33. The transmission assembly of claim 32, wherein the communication bus messages are selected from the group consisting of: Society of Automotive Engineers (SAE) Standard J1939 (Cruise Control/Vehicle Speed (CCVS)) or Electronic Brake Controller 1 (EBC1)), or an OEM proprietary message.

34. The transmission assembly of claim 31, wherein the control unit is further operative to issue a transmission auto-neutral command to the transmission to cause the transmission to transition from said one of the at least one reverse range to the neutral gear when it is determined that the service brake signal indicates that the service brake has been transitioned between applied and not applied a predetermined number of times after the control unit has been initialized, the parking brake signal indicates that the parking brake is applied and the reverse gear is selected.

35. The transmission assembly of claim 34, wherein the control unit is further operative to determine that an operator of the vehicle has changed a selected gear using the transmission gear selector signal and issue the transmission return-to-range command to the transmission to cause the transmission to transition from the neutral gear to said one of the at least one reverse range when it is determined that the operator of the vehicle has changed the selected gear.

36. The transmission assembly of claim 35, wherein the control unit is further operative to inhibit issuing the transmission auto-neutral command if a counter indicates that the system has previously issued the transmission auto-neutral command, then issued the transmission return-to-range command when it is determined that the operator of the vehicle has changed the selected gear, then issued the transmission auto-neutral command more than a predetermined number of times while the vehicle is stationary.

37. The transmission assembly of claim 36, further comprising:

a turbine speed sensor coupled to the transmission and operative to produce a turbine speed signal indicative of a vehicle speed;

wherein the control unit is further operative to determine that one of the at least one reverse range is selected using the transmission gear selector signal, receive a turbine speed signal from the turbine speed sensor, and reset the counter if the transmission gear selector signal indicates that one of the at least one reverse range is selected and the turbine speed signal indicates that the vehicle is not stationary.

38. The transmission assembly of claim 34, wherein the control unit is further operative to inhibit issuing the transmission auto-neutral command if the system has previously issued the transmission return-to-range command, then issued the transmission auto-neutral command, then issued the transmission return-to-range command more than a predetermined number of times while the vehicle is stationary.

39. The transmission assembly of claim 34, wherein the control unit is further operative to inhibit issuing the transmission auto-neutral command if the one or more of the following conditions exists:

a) the service brake signal has not been received for a first predetermined time period;

b) the parking brake signal has not been received for a second predetermined time period;

c) the service brake signal is indicated to be in error; and d) the parking brake signal is indicated to be in error.

40. The transmission assembly of claim 31, further comprising:

a transmission speed sensor coupled to the transmission and operative to produce a transmission output speed signal indicative of an output speed of the transmission;

wherein the control unit is further operative to receive the transmission output speed signal, determine an output speed of the transmission using the transmission output speed signal, issue a transmission auto-neutral command to the transmission to cause the transmission to transition from said one of the at least one reverse range to the neutral gear when it is determined that the service brake signal indicates that the service brake has been transitioned between applied and not applied a predetermined number of times after the control unit has been initialized, the parking brake signal indicates that the parking brake is applied, said one of the at least one reverse range is selected, and an output speed of the transmission is less than a predetermined speed limit.

* * * * *